US009015694B2

(12) United States Patent
Gray et al.

(10) Patent No.: US 9,015,694 B2
(45) Date of Patent: Apr. 21, 2015

(54) CLOUD-BASED FIRMWARE DISTRIBUTION SERVICE

(71) Applicant: Aruba Networks, Inc., Sunnyvale, CA (US)

(72) Inventors: Gordon Paul Gray, Menlo Park, CA (US); Anthony Burke, Frisco, TX (US); David Munro, San Jose, CA (US); Yan Liu, Santa Clara, CA (US); Derek Crovo, San Francisco, CA (US)

(73) Assignee: Aruba Networks, Inc, Sunnyvale, CA (US)

( * ) Notice: Subject to any disclaimer, the term of this patent is extended or adjusted under 35 U.S.C. 154(b) by 39 days.

(21) Appl. No.: 13/829,173

(22) Filed: Mar. 14, 2013

(65) Prior Publication Data

US 2014/0123124 A1 May 1, 2014

Related U.S. Application Data

(60) Provisional application No. 61/720,871, filed on Oct. 31, 2012.

(51) Int. Cl.
*G06F 9/44* (2006.01)
*G06F 9/445* (2006.01)

(52) U.S. Cl.
CPC ....................................... *G06F 8/665* (2013.01)

(58) Field of Classification Search
CPC ........................................................ G06F 8/65
USPC .................................................. 717/168–178
See application file for complete search history.

(56) References Cited

U.S. PATENT DOCUMENTS

| 6,199,204 | B1 * | 3/2001 | Donohue | 717/178 |
|---|---|---|---|---|
| 6,510,466 | B1 * | 1/2003 | Cox et al. | 709/229 |
| 7,069,293 | B2 * | 6/2006 | Cox et al. | 709/203 |
| 7,130,897 | B2 * | 10/2006 | Dervin et al. | 709/221 |
| 7,146,412 | B2 * | 12/2006 | Turnbull | 709/220 |
| 2005/0033933 | A1 | 2/2005 | Hetrick et al. | |
| 2005/0186952 | A1 | 8/2005 | Kitajima | |
| 2005/0228888 | A1 | 10/2005 | Mihm et al. | |
| 2005/0229173 | A1 | 10/2005 | Mihm et al. | |
| 2006/0075276 | A1 | 4/2006 | Kataria et al. | |
| 2006/0119884 | A1 | 6/2006 | Choi | |
| 2006/0168368 | A1 | 7/2006 | Chen et al. | |
| 2006/0174240 | A1 | 8/2006 | Flynn | |
| 2007/0169092 | A1 | 7/2007 | Lee | |

(Continued)

OTHER PUBLICATIONS

Nurmi, D.; Wolski, R.; Grzegorczyk, C.; Obertelli, G.; Soman, S.; Youseff, L.; Zagorodnov, D., "The Eucalyptus Open-Source Cloud-Computing System," Cluster Computing and the Grid, 2009. CCGRID '09. 9th IEEE/ACM International Symposium on, pp. 124-131.*

(Continued)

*Primary Examiner* — Satish Rampuria
(74) *Attorney, Agent, or Firm* — Ying Wang

(57) ABSTRACT

According to one embodiment of the invention, a method for altering stored firmware within a network device comprises receiving, by a first network device, information to download firmware. This information is provided from the first network device to at least a second network device, which is communicatively coupled to the first network device. The information enables the second network device to access a second version of firmware different than a first version of firmware installed on the second network device.

24 Claims, 6 Drawing Sheets

(56) References Cited

U.S. PATENT DOCUMENTS

| | | |
|---|---|---|
| 2007/0174601 A1 | 7/2007 | Douglas et al. |
| 2007/0260790 A1 | 11/2007 | Chen et al. |
| 2008/0098381 A1 | 4/2008 | Lin |
| 2008/0126855 A1 | 5/2008 | Higashijima et al. |
| 2008/0127166 A1 | 5/2008 | Cockburn et al. |
| 2008/0189693 A1 | 8/2008 | Pathak |
| 2009/0007136 A1 | 1/2009 | Endou |
| 2009/0063766 A1 | 3/2009 | Matsumura et al. |
| 2009/0228740 A1 | 9/2009 | Higashijima et al. |
| 2009/0249320 A1 | 10/2009 | Su et al. |
| 2011/0128158 A1 | 6/2011 | Chou |
| 2012/0036343 A1 | 2/2012 | Lee |
| 2012/0060152 A1 | 3/2012 | Oh et al. |
| 2012/0062948 A1 | 3/2012 | Nishikawa |
| 2012/0117365 A1 | 5/2012 | Navy et al. |
| 2012/0198434 A1 | 8/2012 | Dirstine et al. |
| 2012/0216183 A1 | 8/2012 | Mahajan et al. |
| 2012/0272226 A1 | 10/2012 | Yang et al. |
| 2013/0159991 A1 | 6/2013 | Sato |
| 2013/0227538 A1 | 8/2013 | Maruyama |
| 2013/0276128 A1 | 10/2013 | Konetski et al. |
| 2013/0290947 A1 | 10/2013 | Li |
| 2013/0339938 A1 | 12/2013 | He |
| 2014/0033188 A1 | 1/2014 | Beavers et al. |
| 2014/0068342 A1 | 3/2014 | Chuang |
| 2014/0068585 A1 | 3/2014 | Young et al. |
| 2014/0068594 A1 | 3/2014 | Young et al. |
| 2014/0122674 A1 | 5/2014 | Gray et al. |

OTHER PUBLICATIONS

Armbrust, Michael, et al. "A view of cloud computing." Communications of the ACM 53.4 (2010), pp. 50-58.*

Dikaiakos, M.D.; Katsaros, D.; Mehra, P.; Pallis, G.; Vakali, A., "Cloud Computing: Distributed Internet Computing for IT and Scientific Research," Internet Computing, IEEE, vol. 13, No. 5, pp. 10-13.*

Armburst et al., "A view of Cloud Computing", Communications of the ACM, vol. 53, No. 4, Apr. 2010, pp. 50-58.

Dikaiakos et al.. "Cloud Computing: Distributed Internet Computing for IT and Scientific Research", IEEE, Internet Computing, Sep./Oct. 2009, pp. 10-13.

Nurmi et al., "The Eucalyptus Open-source Cloud-computing System", International Symposium on Cluster Computing and the Grid, IEEE, May 2009, pp. 124-131.

* cited by examiner

FIG. 4

| Platform ▼ | Version ▼ | Build ▼ | O... ▼ | File Name ▼ | File Size ▼ | Track ▼ | Dependent ▼ | Created By ▼ | Upload Date ▼ |
|---|---|---|---|---|---|---|---|---|---|
| P1 | 6101 | 35890 | A | A_P1_6101 | 5.47 Mb | Release | No | admin | 10/30/2012 2:25 PM |
| P2 | 6101 | 35890 | A | A_P2_6101 | 5.37 Mb | Release | No | admin | 10/30/2012 2:24 PM |
| P1 | 6095 | 35899 | A | A_P1_6101 | 5.7 Mb | Release | No | admin | 10/30/2012 2:24 PM |
| P2 | 6095 | 35899 | A | A_P2_6101 | 5.6 Mb | Release | No | admin | 10/30/2012 2:23 PM |
| P1 | 6096 | 35320 | B | B_P1_6101 | 5.72 Mb | Release | No | admin | 10/29/2012 1:09 PM |
| P2 | 6096 | 35320 | A | A_P2_6101 | 5.62 Mb | Release | No | admin | 10/29/2012 1:09 PM |
| P2 | 6096 | 35320 | A | A_P2_6101 | 5.6 Mb | Release | No | admin | 9/25/2012 8:17 PM |
| P1 | 6098 | 35320 | A | A_P1_6101 | 5.7 Mb | Release | No | admin | 9/25/2012 8:15 PM |
| P1 | 6098 | 34479 | B | B_P1_6101 | 5.83 Mb | Release | No | admin | 7/17/2012 6:37 PM |

Firmware Detail

Platform: P1
Version: 6101
Build: 35890
OEM: A
Checksum: 4017E518EEB7F8A6550BCD158230BB1A96C3D4E9
File Name: A Instant .1
File Size: 5.47 Mb
Created By: admin
Create Date: 10/30/2012 2:25 PM Devices using this Firmware

[Edit] [Delete]

CLOUD-BASED FIRMWARE DISTRIBUTION SERVICE

CROSS-REFERENCE TO RELATED APPLICATIONS

This application claims the benefit of priority on U.S. Provisional Application No. 61/720,871 filed Oct. 31, 2012, the entire contents of which are incorporated by reference.

FIELD

Embodiments of the disclosure relate to the field of communications, and in particular, to a system and method directed to automated firmware updates of network devices.

GENERAL BACKGROUND

Over the last decade or so, access points normally are provisions by Information Technology (IT) personnel. For instance, according to a conventional deployment scenario, manufacturers are responsible for providing access points to a service provider. Thereafter, the service provider provisions the access points for a particular customer and then re-labels and re-ships these access points to that customer for deployment. For firmware updates, the service provider normally send technicians to a site to upload or provide necessary firmware to IT personnel who would be responsible for controlling firmware upgrades to network devices. Overall, these upgrade schemes are costly and sometimes may compromise security especially when upgrades are delayed for a prolonged period of time.

BRIEF DESCRIPTION OF THE DRAWINGS

The invention may best be understood by referring to the following description and accompanying drawings that are used to illustrate embodiments of the disclosure.

FIG. 4 is an exemplary embodiment of a dashboard produced by cloud-based, firmware update distribution service illustrating firmware updates maintained and controlled by a cloud (or dedicated firmware) server.

DETAILED DESCRIPTION

Figure 1:
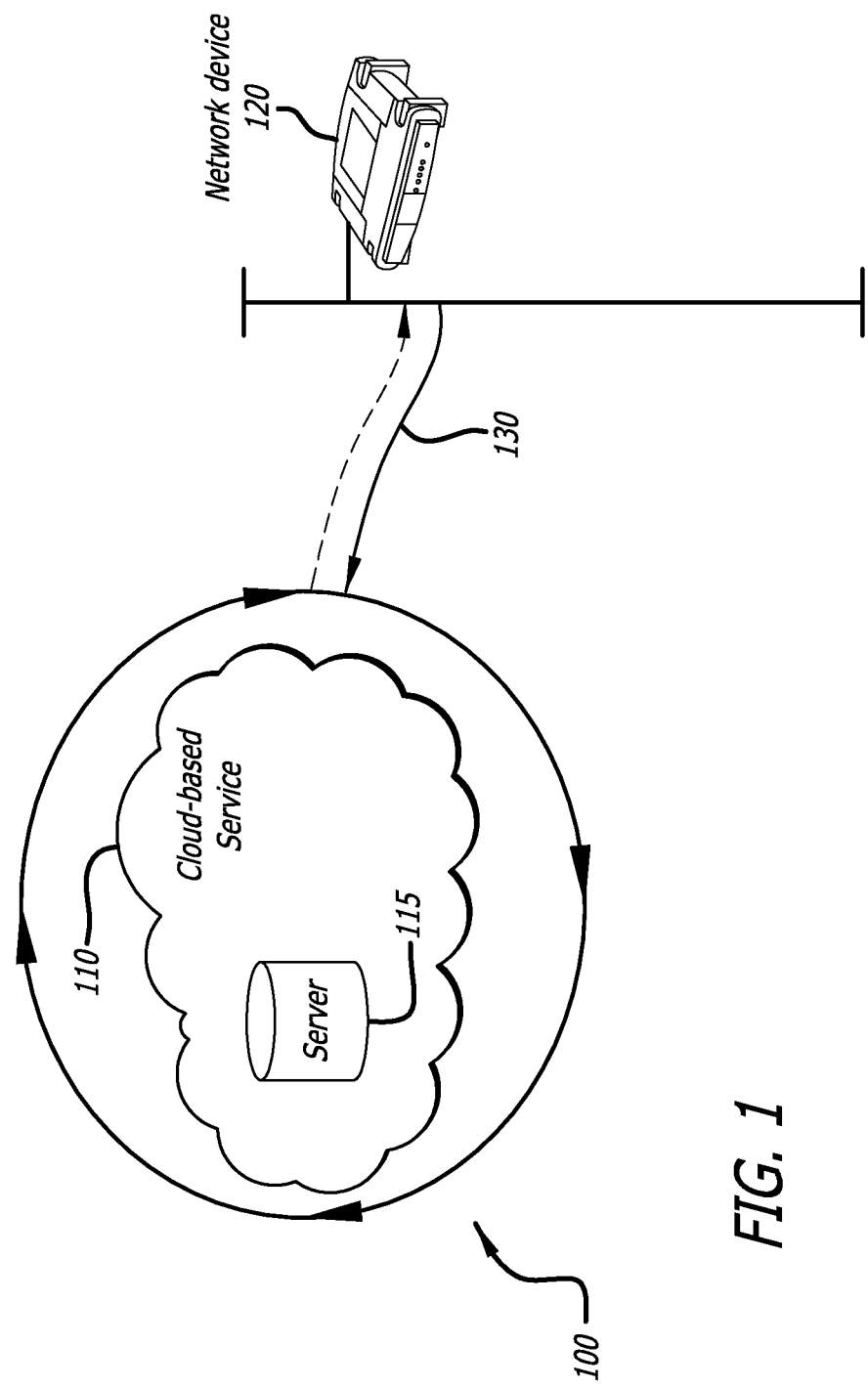
FIG. 1 is an exemplary embodiment of a network utilizing a cloud-based, firmware update distribution service.

Embodiments of the disclosure are directed to a cloud-based firmware distribution service supporting multiple platforms on multiple network devices (including hierarchical network devices operating as virtual control devices and subordinate network devices). The cloud-based firmware distribution service is adapted to provide firmware checking operations and/or upgrade/downgrade services to subscribed network devices and/or their subordinate network devices. This firmware distribution service may be set to automatically activate after a predetermined period of time has elapsed in order to determine whether firmware updates are necessary and update the firmware accordingly. Alternatively, the firmware update may be prompted by onsite Information Technology (IT).

In general, according to one embodiment of the disclosure, a network device posts a message to a specific uniform resource locator (URL) (e.g., devices.companyA.com/firmware). The message contains one or more of the following elements within the header: (i) an identifier of the current version of the firmware and (ii) device information. The uploaded device information includes one or more of the following: (1) Media Access Control (MAC) address for the network device; (2) serial number for the network device; and/or (3) type (part number) of the network device.

Where the network device is a particular type of device, identified by a mode of operation such as an Independent Access Point (IAP) type, keying material related to a particular version of the firmware may be provided in the header of the message. This keying material enables the network device to get access to legacy firmware images with respect to a specific OEM and version number(s). Hence, the network device is able to obtain upgrades and downgrades of non-current versions of the firmware. An illustrative process in the usage of keying material for firmware updates is shown below:

1. Support uploads a new firmware version to a particular server (e.g., cloud server) being part of the cloud-based services;
2. Cloud server generates unique keying material related to this particular version of the firmware;
3. This keying material is placed on the support site, so customers that have registered for firmware support have access to the key;
4. Customer inputs or uploads a file containing this keying material into the network device (where device may be a virtual control device);
5. When communicating with the cloud server, the network device passes the keying material in an element within the header of the post message;
6. The cloud server may respond with the firmware version related to this keying material instead of the latest version of the firmware to enable upgrades and downgrades according to the keying material provided If the network device is determined to be a subscriber to the cloud-based service, the cloud server may be adapted to conduct an authentication scheme to verify the authenticity of the network device. As an example, a challenge/response exchange may be performed in which the cloud server provides a response message with data (challenge) that is signed with a private key securely contained within the network device. The signed challenge and a pre-stored digital certificate are returned to the cloud server. Once the digital certificate is validated by the cloud server, the server validates the signed challenge by determining whether the signed challenge matches the original challenge using the certificate included in the body of the response message.

Alternatively, in lieu of a challenge/response exchange for authentication described above, the firmware-check and firmware-update messages could be facilitated in a single message, where the server validates the network device's certificate within Secure Socket Layer (SSL) negotiations.

Upon successful validation, the network device may receive a validation-response message indicating that a successful firmware post and response as to whether the current firmware version is the updated version. Other validation-response messages may include successful firmware post and response with an URL to a current firmware update having intermediary versions of the updates or without intermediary versions of the firmware update.

Where the network device and subordinate (downstream) network devices have the same device and/or platform type and run the same firmware version, the network device, operating as a virtual control device, may download the firmware and provide the same to the subordinate network devices. However, for subordinate network devices of different device and/or platform types, the network device provides the URLs for the subordinate network device to use to obtain the updated firmware. One reason that URLs may be provided to the subordinate network device, in lieu of firmware images themselves, is based on the network device having limited storage capacity. This limited storage capacity precludes the network device from storing multiple firmware images needed by the subordinate network devices.

Herein, certain terminology is used to describe features of the disclosure. For example, the term "network device" generally represents electronics that support the receipt and/or transmission of wireless communications including, but not limited or restricted to an Access Point (AP); server; a base station; a data transfer device (e.g., switch, router, bridge, brouter, etc.); communication management device or any device that operates as a conduit for information traveling over a network.

It is contemplated that a network device may include hardware logic, including one or more of the following: (i) processing circuitry; (ii) one or more communication interfaces such as radios (e.g., one or more components that handle the wireless data transmission/reception) and/or physical connectors to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Additionally, the term "logic" is generally defined as hardware and/or software. As hardware, logic may include a processor (e.g., processing circuitry such as a controller, a microprocessor, digital signal processor, a programmable gate array, an application specific integrated circuit, combinatorial logic, etc). As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

"Firmware" denotes software that controls functionality of the network device. Examples of firmware include software pertaining to an operating system or Basic Input Output System (BIOS) (e.g., boot block).

An "interconnect" is generally defined as a communication pathway established over an information-carrying medium. This information-carrying medium may be a physical medium (e.g., electrical wire, optical fiber, cable, bus traces, etc.), a wireless medium (e.g., air in combination with wireless signaling technology) or a combination thereof. The data transferred over the interconnect may be in accordance with a variety of communication protocols including, but not limited or restricted to those protocols in accordance with WIFi™, various IEEE 802.11 standards (e.g., IEEE 802.11ac, 802.11n, etc.), or the like.

Lastly, the terms "or" and "and/or" as used herein are to be interpreted as inclusive or meaning any one or any combination. Therefore, "X, Y or Z" or "X, Y and/or Z" mean "any of the following: X; Y; Z; X and Y; X and Z; Y and Z; X, Y and Z." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations are not set forth in detail in order to avoid unnecessarily obscuring this description.

I. Firmware Distribution Service Architecture

Referring to FIG. 1, an exemplary embodiment of a network 100 utilizing a cloud-based, firmware update distribution service is shown. Herein, network 100 comprises a cloud-based service 110 that is adapted for receiving communications from one or more network devices 120.

Herein, cloud-based service 110 comprises one or more servers 115 that collectively operate to manage firmware updates. In particular, cloud-based service 110 is configured to receive firmware updates from network device manufacturers, sellers and/or network service providers and coordinate seamless firmware updates for network device 120. The distribution of these firmware updates is managed as response messages to periodic firmware-check messages initiated from the network devices 120.

For instance, one or more servers 115 within cloud-based service 110 (hereinafter referred to as "cloud server 115") are adapted to receive firmware-check messages 130 from network device 120. Each firmware-check message 130 causes cloud server 115 to determine (i) if network device 120 is authenticated as a device that may utilize this service, and (ii) whether network device 120 is loaded with current firmware or whether a firmware update is needed. The message flow for the firmware update is described in FIG. 5.

Figure 2:
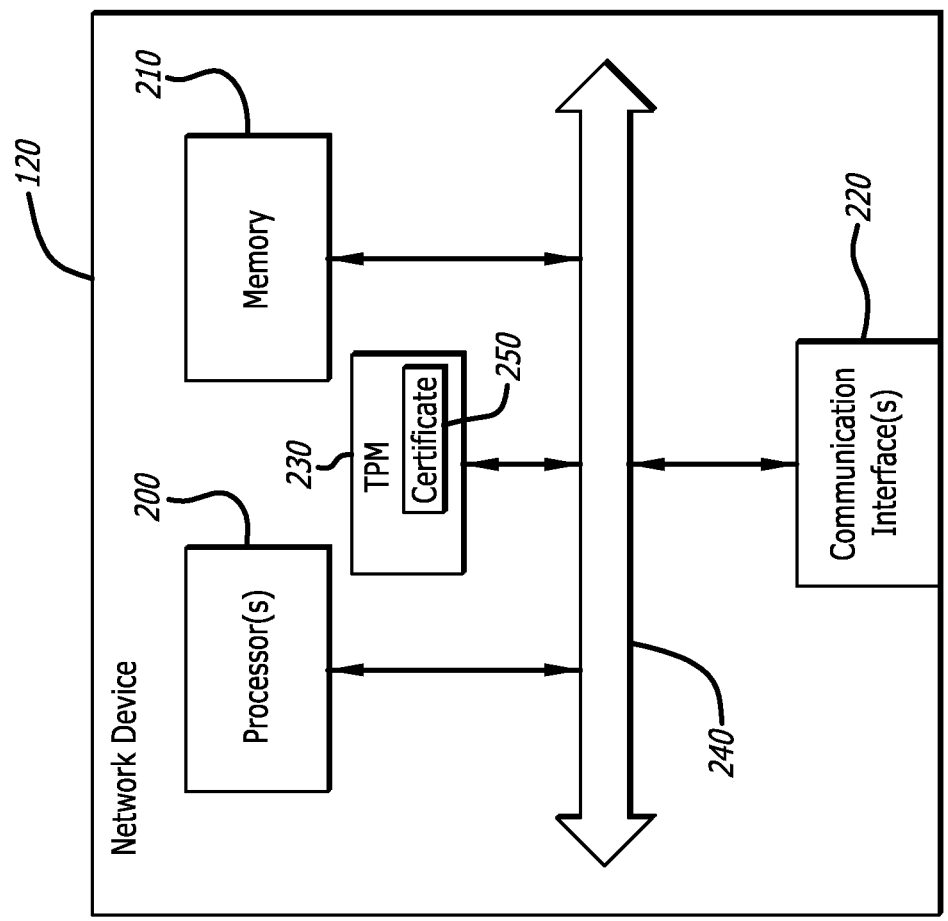
FIG. 2 is an exemplary embodiment of the network device implemented within the network of FIG. 1.

Referring now to FIG. 2, an exemplary embodiment of network device 120 operating in combination with cloud-based service 110 is shown. In accordance with one embodiment of the disclosure, network device 120 comprises processor logic 200, a memory 210 and a communication interface 220 that is adapted to communicate with other devices supporting wired and/or wireless connectivity. For instance, memory 210 may be a type of non-volatile memory adapted to store firmware update logic 225, which controls the firmware requests and distribution, as well as firmware for different device platforms and/or different versions of firmware for the same device platform, as shown in FIG. 4. Although, in order to reduce costs, memory 210 may be sized to only store a single version of the firmware. Communication interface 220 may comprise a wired port and/or one or more radios, tuners, and/or antenna(s) that support wireless communications.

Optionally, network device 120 may include a trusted platform module (TPM) 230 in communication with processor 200 and memory 210 over an interconnect 240. The TPM 230 comprises a digital certificate 250 that includes a serial number and/or MAC address of network device 120. Certificate 250 may be used to verify to cloud server 115 of FIG. 1 that a firmware-check message is from an authenticated network device.

II. Configuration of Firmware Files in the Cloud

Figure 3:
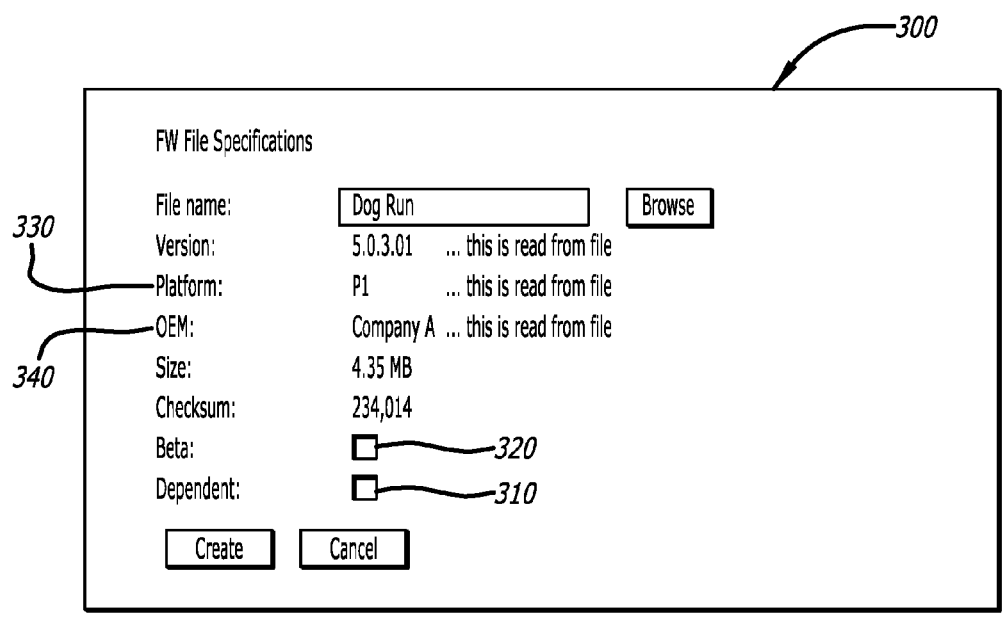
FIG. 3 is an exemplary embodiment of a user interface display of a firmware file for configuration.

As shown in FIG. 3, a display 300 of firmware file parameters that can be created or modified is shown. To determine an appropriate firmware version for a network device, cloud-based service 110 applies the following rules:

(1) Dependent—"dependent" flag 310 indicates that any subsequent versions of firmware will require upgrading to this version first.

(2) Beta—"beta" flag 320 indicates that, if a network device requests a firmware check, the cloud-based firmware distribution service will determine which newer beta images are the latest and send the latest beta image back to the network device. The network device may not know whether the running version of its image is a beta firmware release or production firmware release, and beta flag 320 provides such information. Conversely, if a network device requests a firmware check and that network device is currently running a production firmware version, the cloud-based firmware distribution service will only send the latest production firmware image.

(3) Platform 330—indicates the type of platform represented by a unique firmware image. One or more different network devices may support the same "platform" and utilize the same firmware image.

(4) OEM 340—indicates a company associated with the installed firmware image. This enables multiple OEMS to be supported for a particular firmware image.

Referring now to FIG. 4, an exemplary embodiment of a dashboard display 400 produced by cloud-based service 110 and accessible for firmware downloads is shown. Herein, different firmware for different platforms, namely different types of network devices, is shown. For instance, as shown in entries 410 and 415 of dashboard 400, firmware version 6101 is available for platforms P1 and P2. Other firmware parameters may include file name 420, version 430, platform 440, OEM 450, size 460 and/or checksum 470.

As optional features, dashboard display 400 may feature a device summary 480 that features an organized layout of the parameters for firmware associated with entry 410. Also, dashboard display 400 may also feature an area that lists all of the types of devices that may be implemented with the firmware set forth in device summary 480.

III. Firmware Update Distribution Service Protocols

Figure 5:
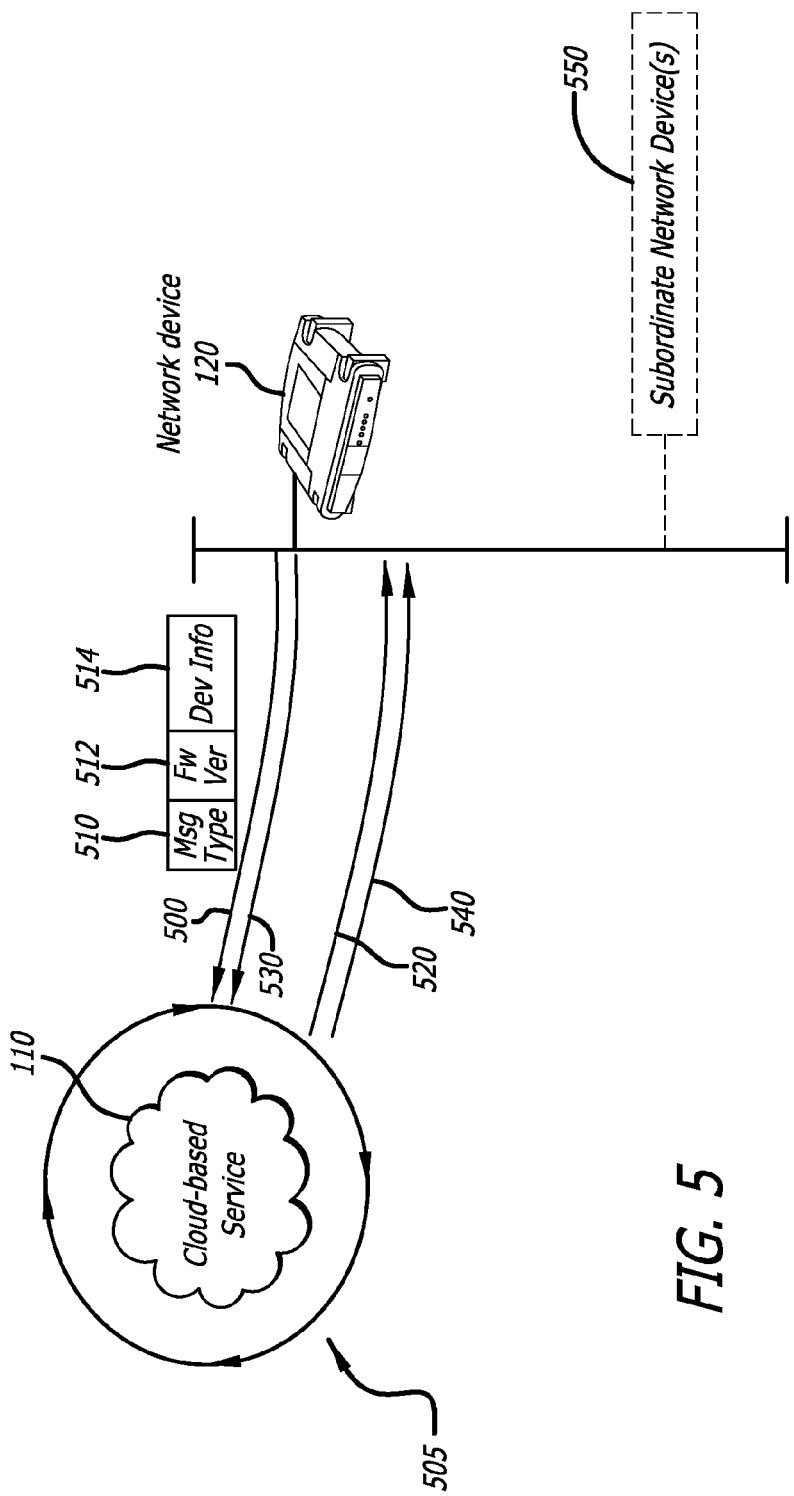
FIG. 5 is a general embodiment of the message flow supported by the firmware update distribution service.

Referring to FIG. 5, an exemplary embodiment of the cloud-based, firmware update scheme utilized by network device 120 is shown. Initially, network device 120 is activated and operational on a network 505. In response to a triggering event, network device 120, operating in accordance with firmware update logic 225, posts a message 500 to a cloud server of cloud-based service 110. Examples of different types of triggering events include, but are not limited or restricted to (i) a time-based event in which a predetermined amount of time has elapsed (e.g., multiple days such as a week); or (ii) a change in responsibilities for network device 120 (e.g., assignment to be a "virtual control device," joining of one or more additional subordinate network devices 550 when network device 120 operates as a virtual control device, etc.).

According to one embodiment of the disclosure, message 500 comprises information that identifies (i) message type (firmware-check) 510, (ii) a current firmware version 512 loaded on network device 120, (iii) device information 514 associated with network device 120. Device information 514 may include (1) a Media Access Control (MAC) address for network device 120; (2) a serial number for network device 120; (3) a device type identifier for network device 120; and/or (4) a hexadecimal string value related to a particular version of the firmware. Normally, the hexadecimal string value is generated by the cloud server of cloud-based service 110 when a particular firmware image is uploaded so as to pair the value to the firmware image.

Upon receipt of message 500 and verification that network device 120 subscribes to firmware update distribution service, cloud-based service 110 initiates one or more challenge/response exchanges in order verify that message 500 originated from network device 120. A challenge message 520 comprises a random or pseudo random value that is subsequently operated upon by network device 120 and returned as part of response message 530. Challenge message 520 may further solicit transmission of digital certificate 250 from a trusted platform module (TPM) deployed within network device 120. This challenge/response exchange may be used to prevent "man-in-the-middle" attacks.

Upon receipt of information with response message 530 and successful authentication of network device 120, cloud-based service 110 returns a validation-response message 540 providing desired version of firmware for network device 120 and/or URLs to firmware updates for multiple device types in the event that network device 120 is operating as a virtual control device for other network devices.

As a virtual control device, network device 120 only needs to send a single line for all subordinate network devices, such as access points, controllers, switches, etc., because it is typically assumed that all subordinate network devices 550 are running the same version of software as the virtual control device. In this implementation, as a virtual control device, network device 120 receives a list of URLs with links to download a firmware image corresponding to a particular firmware version for various device types. Hence, firmware update logic 225 of network device 120 can download the firmware image for itself, and allow its subordinate network device(s) to retrieve the firmware image from itself instead of through the link, thereby reducing the network traffic load. A subordinate network device 550 only needs to access the URL to download the firmware if its device type is different from network device 120, or if it changes its virtual control device. During the firmware update process, if it is revealed that the MAC address and serial number combination of subordinate network device 550 is new or is associated with a different virtual control device, then that subordinate device's record should be updated to the new network device.

Thereafter, firmware update logic 225 of network device 120 loads the firmware update and, according to this illustrative embodiment, resets a timer/counter that will prompt network device 120 to post another firmware-check message to cloud server 115 after another predetermined amount of time has elapsed.

Figure 6:
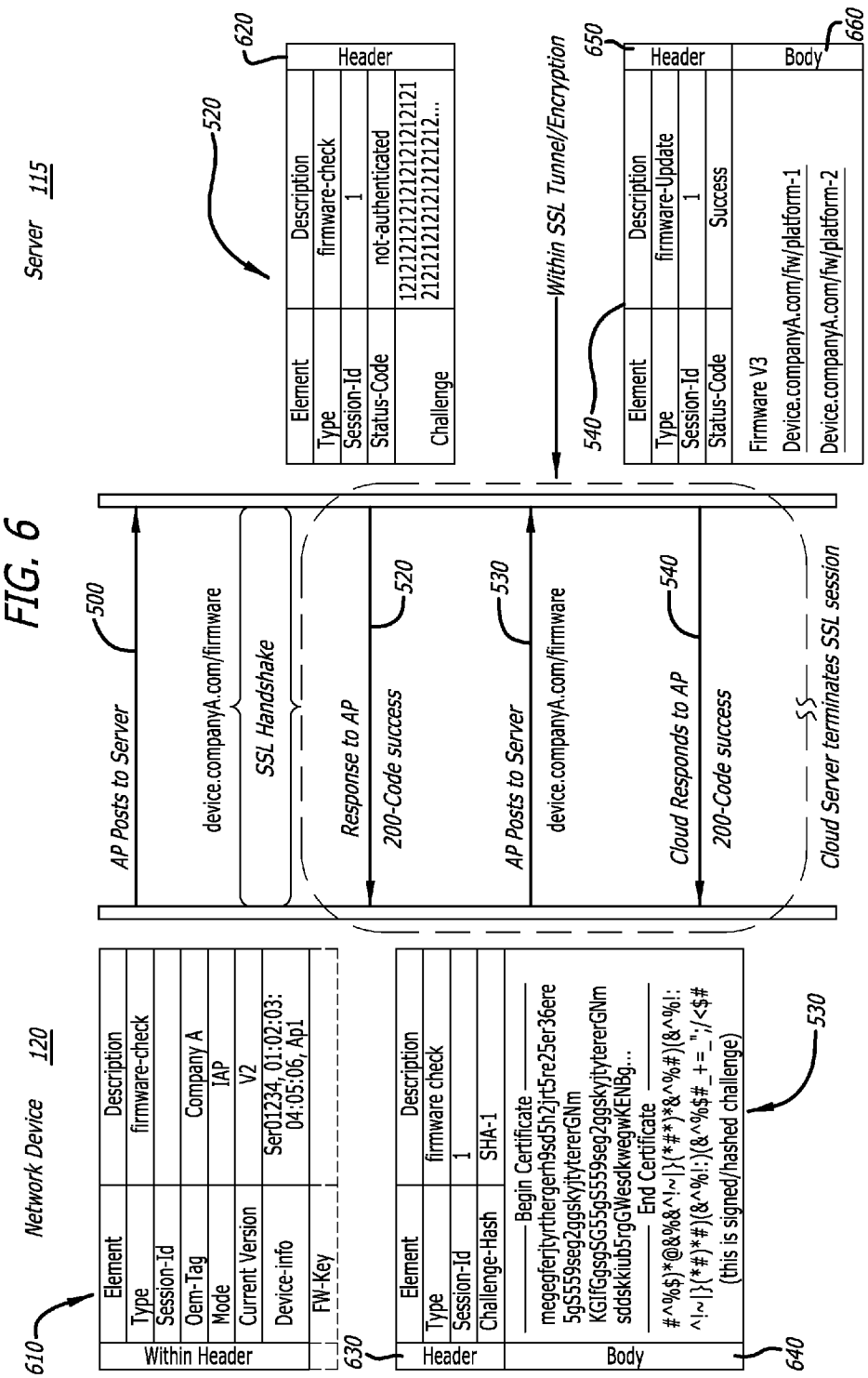
FIG. 6 is a detailed embodiment of the message flow for the cloud-based, firmware update distribution service.

Referring now to FIG. 6, a more detailed embodiment of the cloud-based, firmware update distribution scheme of FIG. 1 utilized by network device 120 is shown. In general, the cloud (or dedicated firmware) server 115 can provide for both firmware upgrades and downgrades. Also, while providing firmware upgrade/downgrade services, the cloud (or dedicated firmware) server 115 may require a match of the OEM information if the firmware request by the network device requests an OEM version.

A. Network Device's Initial Firmware-Check Post

Network device 120 may be adapted to post to the URL: device.companyA.com/firmware with a keep-alive connection specification containing one or more of the following elements contained within a header 610 of firmware-check message 500:

Header Elements for Firmware-Check Message
Type value (firmware-check)

Session-Id (blank)
OEM-Tag
    (blank)—for OEM 1
    (A)—for OEM 2
    (B)—for OEM 3
Mode
    (RAP)—Remote AP (RAP1, and RAP2 devices)
    (IAP)—Independent AP (IAP-1, IAP-2, AP-4)
    (BOC)—Branch Office Controller (6xx)
    (CTRL)—Controller (1x, 2x)
    (SWITCH)—Switches (1x, 2x)
FW-Version
    Firmware Version (e.g., OS version)
Device-Info—this element contains the following values: serial number of network device 120, MAC address of network device 120, and part number, which are delimited by a comma, provided the number of subordinate network devices is less than a preset threshold (e.g., 100). If the number of subordinate network devices exceeds the preset threshold, the device information may be included within the HTML body of the message. Example: Ser01234, 01:02:03:04:05:06, AP1
Optional Header Elements for Firmware-check message
FW-Key—multiple character hexadecimal string related to a particular version of firmware
    This value is generated by cloud server for cloud-based service when a firmware image (e.g., OS image) is uploaded
    Example—40 character string aa36a3ef6d6b4b0e7151bfef85631791bea82417

FW-Key is an optional element, and it is contemplated that FW-Key may only sent by IAPB, namely APs without need of controller connectivity unlike Remote APs ("RAPs") which are network devices in a controller-based operating mode. This element provides a method for IAPB to get access to images with a specific (OEM, version). Hence, customers that have subscribed for firmware update support are able to upgrade or downgrade to non-current versions. The key (or keying material) is a SHA-1 hashed value, which makes it very difficult for a customer without support to guess the key.

An illustrative embodiment of operational flow of the use of the key is described below:

1. Support uploads a new firmware version to the cloud server 115;
2. Cloud server 115 generates a unique key (keying material) associated this particular version of firmware;
3. This key is placed on a customer support website to provide subscribing customer access to the key;
4. Customer inputs or uploads a file containing this key into network device 120 operating as a virtual control device;
5. When network device 120, which may be subordinate to or managed by the virtual control device, communicates with cloud server 115, network device 120 passes this key in its firmware check request (e.g., in FW-Key element).
6. Cloud server 115 thereafter responds with the particular firmware version associated with this key instead of the latest version.

B. Cloud Server's Response to Initial Firmware-Check Post

Cloud server 115 may be configured to determine the device's authentication state by evaluating the session-id element provided in the posted firmware-check message. Cloud server 115 may be further adapted to respond with a challenge message 520 with a keep-alive connection specification (timeout=15 and max=100) containing one or more of the following elements in header 620:

Header Elements for Response to Firmware-Check Message
    Type value (firmware-check)—Cloud server 115 responds with the same API
    Session-Id (session)—Cloud server 115 provides a random number unrelated to the challenge element.
    Status-Code: (not-authenticated)
    Challenge Question—a random or pseudo-random stream greater than 200 bytes Cloud server 115 may respond with an HTTP Status code of 200 indicating the request succeeded. Furthermore, cloud server 115 may record the network device's last contacted information in a device table. Other elements in a device table may be updated also if information received from network device 120 is different than stored: first-seen, mode of operation, controller accessed by network device 120, OS version, boot block version, and/or source IP address (obtained from post message 500 itself).

C. Device's Secondary Firmware-Check Post

Network device 120 may be adapted to post message 530 to the URL: device.companyA.com/firmware with a close connection specification containing one or more of the following elements within header 630 and body 640 of message 530:

Header Elements for Response Message
    Type value (firmware-check)
    Session-Id—respond with the same value provided by the Cloud server's response
    Challenge Response—normally signed and includes the certificate of signature (see below). This enables the server to validate the response and ensure the certificate contains the proper serial number and MAC address that the network device issued in the first request
    Body Contents
    Signed Challenge—the element may contain the same value provided by the response message from cloud server 115, but it is signed with a private key contained within the TPM of the network device 120 using a selected algorithm. The signed challenge and certificate are contained in the body because the header does not support special characters. It is contemplated that the signed challenge and certificate may be implemented within the header if permitted.
    Certificate—an element that may be contained within a TPM. The certificate may be attached in PIM format.

D. Cloud Server's Validation and Response to Secondary Firmware-Check Post

Cloud server 115 may validate the digital certificate, and thereafter, server 115 may validate that the signed challenge matches the original challenge using the certificate included in the body of the response message.

Cloud server 115 may respond with validation-response message 540 that comprises a header 650 and body 660 with one or more of the following elements:

Header Elements in the Validation-Response Message
    Type value (firmware-check)
    Session-Id—the same value original generated on the server
    Status-Code—either:
        Success—means the device passed authentication.
        Failure—an error has occurred, such as:
    Related to Firmware 'Invalid1—the cloud server does not understand or know about the current firmware version.
        Invalid2—the part number or platform are unknown or invalid.
        Invalid3—the keying material requested does not match the OEM-Tag element.

Related to Authentication
   Fail-auth1—cloud server could not validate the signed challenge response
   fail-auth2—cloud server could not validate the digital certificate from the network device If authentication is successful, cloud server 115 returns the desired or latest version (of firmware) and URLs to those firmware files within the body of validation-response message.

Body Elements in the Validation-Response Message
Desired version (V3)
   The desired version may be returned when the Status-Code equals success
   The desired version may be returned even if the current version equals the desired version (the network device is running the most current code).
Platform/Device URLs—the URL which points to each device's firmware file that matches the desired version. Each URL is delimited
   URLs are not protected so they can be retrieved by the network device using HTTP
   The assumption is that logic within the network device understands which subordinate network device needs to be upgraded when the network device operates as a virtual control device.

Cloud server 115 may respond with an HTTP Status code of 200 indicating the request succeeded. Error conditions related to the firmware-check API may be contained within the Status-Code element.

Cloud server 115 may terminate the SSL session immediately after successful response to the provision-update response. Network device 120 may log errors from Status-Code and errors encountered obtaining and applying firmware appropriately in syslog or the Web UI.

E. Retrieving Firmware

Network device 120 is configured to retrieve the firmware updates using HTTP and the URL ascertained in the firmware check described above. This URL may be related to "device.company.com," namely OEM, retailer, software manufacturer responsible for the firmware. Alternatively, this URL may relate to "fwfiles.company.com," namely a dedicated firmware server to which firmware updates have been off-loaded.

Header Elements for Firmware Retrieval Message
Device-Info—this element contains the following values: serial number for network device 120, MAC address for network device 120, and part number, which are delimited by a comma.
   Example: Ser01234, 01:02:03:04:05:06, AP1

It is contemplated that the retrieval of firmware features only one header element. This information is needed for cloud server 115 to understand which device is retrieving the firmware.

It is further contemplated that network device 120 normally issues firmware-check message 510 that is adapted to obtain the latest version of the firmware. However, where network device 120 operates as a virtual control device, firmware-check message 510 may request a specific version of the firmware that is different from the latest version, where the selected version is based on the version of firmware supported by a cluster (e.g., one or more) of subordinate network devices controlled by network device 120. For instance, if the cluster of subordinate network devices are all running "version 1.2" and a new subordinate network device operating with "version 1.3" attempts to join the cluster, network device 120 issues firmware-check message 510 for "version 1.2" in order to downgrade the new subordinate network device that version of firmware.

IV. Reporting Interface of Firmware Distribution Service

In addition, the cloud-based firmware distribution service displays one or more of the followings to the administrator:
(1) an information panel providing data from a master firmware record;
(2) file history information providing records of firmware history;
(3) a download history;
(4) graphical illustration of a count of downloads over a prescribed period of time;
(5) statistical data about the number of downloads by device type;
(6) statistical data about devices currently known to be running or last ran the particular firmware version.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the foregoing claims and their equivalents. The descriptions are thus to be regarded as illustrative instead of limiting.

What is claimed is:

1. A method comprising:
   sending, by a first network device, information regarding a first version of firmware installed on the first network device to one or more servers,
   receiving, by the first network device, information to download firmware from the one or more servers, the information to download firmware including one or more uniform resource locators (URLs) providing access to a second version of the firmware for loading on the first network device, the second version of the firmware being different from the first version of firmware installed on the first network device; and
   in response to receiving the information to download firmware by the first network device that is operating as a virtual control device for a second network device,
      downloading, by the first network device, the second version of the firmware that is different than the first version of the firmware installed on the first network device,
      providing, by the first network device, the downloaded second version of the firmware to the second network device when the second network device is a same device type as the first network device, and
      providing, by the first network device, the information to download firmware to the second network device when the second network device is a different device type than the first network device, the information to download firmware enabling the second network device to access a second version of firmware for the different device type than the first network device directly from the one or more servers.

2. The method of claim 1, wherein the one or more URLs providing access to one or more firmware images including a firmware image of the second version of the firmware, each URL corresponds to a firmware image associated with a different type of network device.

3. The method of claim 1, wherein prior to receiving the information to download firmware, the method further comprises in response to a triggering event, posting a message including information that identifies the first firmware version loaded on the first network device and information that identifies the first network device;
responding to a challenge initiated by the one or more servers to authenticate the first network device.

4. The method of claim 3, wherein the triggering event comprises a change in responsibility for the first network device, the change in responsibility includes (i) assigning of the first network device as the virtual control device or (ii) the second network device joining as one or more subordinate network devices to which the first network device forwards firmware updates received from the one or more servers.

5. The method of claim 3, wherein triggering event comprises a time-based event in which a predetermined amount of time has elapsed from an update of the first version of the firmware by the first network device.

6. The method of claim 1, wherein the second version of the firmware is either (i) an earlier version than the first version of the firmware installed on the second network device or (ii) a more recent version than the first version of the firmware installed on the second network device.

7. The method of claim 1, wherein prior to receiving the information to download the firmware, the method further comprising:
transmitting keying material identifying the second version of the firmware installed on the second network device to the one or more servers providing a cloud-based service.

8. The method of claim 1, wherein prior to receiving the information to download the firmware, the method further comprising:
detecting, by the first network device, the second network device recently joining a cluster of network devices controlled by the first network device, each network device of the cluster supporting the second version of the firmware and the second network device installed with the first version of the firmware;
transmitting, by the first network device, keying material identifying the second version of the firmware to the one or more servers providing a cloud-based service;
receiving, by the first network device, the information to download the second version of the firmware.

9. The method of claim 8, wherein the first network device further transmitting to the one or more servers providing the cloud-based service one or more of (i) a serial number for the first network device, (ii) a media access control (MAC) address for the first network device, and (iii) a part number.

10. A network device comprising:
a processor; and
a memory coupled to the processor, the memory including firmware update logic that, when executed by the processor, causes the network device to perform one or more operations that comprise:
sending information regarding a first version of firmware installed on the network device to an external source,
receiving information to download firmware from the external source, the information to download firmware including one or more uniform resource locators (URLs) providing access to a second version of the firmware for loading on the network device, the second version of the firmware being different from the first version of firmware installed on the network device, and in response to receiving the information to download firmware by the network device operating as a virtual control device for a second network device,
downloading the second version of the firmware that is different from the first version of the firmware installed on the network device,
providing the downloaded second version of the firmware to the second network device when the second network device is a same device type as the network device, and
providing the information to download firmware to the second network device when the second network device is a different device type than the network device, the information to download firmware enabling the second network device to access a second version of firmware for the different device type than the network device directly from the one or more servers.

11. The method of claim 1, wherein the one or more URLs associated with the information to download firmware comprises information to identify one or more storage locations for accessing a firmware image of the second version of the firmware.

12. The system of claim 10, wherein the device type is an Access Point.

13. The network device of claim 10, wherein the one or more URLs providing access to one or more firmware images including a firmware image of the second version of the firmware, each URL corresponds to a firmware image associated with a different type of network device.

14. The network device of claim 10, wherein the firmware update logic further perform operations comprising:
prior to receiving the information to download the firmware, in response to a triggering event, posting a message including information that identifies the first firmware version loaded on the network device and information that identifies the network device; and
responding to a challenge initiated by the one or more servers to authenticate the network device.

15. The network device of claim 14, wherein the triggering event comprises either (1) a time-based event in which a predetermined amount of time has elapsed from loading of the first version of the firmware on the network device.

16. The network device of claim 10, wherein the second version of the firmware is an earlier version than the first version of the firmware installed on the second network device.

17. The network device of claim 14, wherein the-triggering event comprises a change in responsibility for the network device, the change in responsibility includes (i) assigning of the network device as the virtual control device or (ii) the second network device joining as one or more subordinate network devices to which the network device forwards firmware updates received from the one or more servers.

18. The network device of claim 10, wherein the firmware update logic, when executed by the processor, causes the network device to perform one or more operations further comprising:
prior to receiving the information to download the firmware, transmitting keying material identifying the second version of the firmware installed on the second network device to the one or more servers providing a cloud-based service.

19. The network device of claim 10, wherein the firmware update logic, when executed by the processor, causes the network device to perform one or more operations further comprising:

prior to receiving the information to download the firmware, detecting the second network device recently joining a cluster of network devices controlled by the network device, each network device of the cluster of network devices supporting the second version of the firmware and the second network device installed with the first version of the firmware;

transmitting keying material identifying the second version of the firmware to the one or more servers providing a cloud-based service; and receiving the information to download the second version of the firmware.

20. The network device of claim 19, wherein the firmware update logic, when executed by the processor, causes the network device to perform one or more operations further comprising:

transmitting to the one or more servers providing the cloud-based service one or more of (i) a serial number for the network device, (ii) a media access control (MAC) address for the network device, and (iii) a part number.

21. The network of claim 10, wherein the one or more URLs associated with the information to download firmware comprises information to identify one or more storage locations for accessing a firmware image of the second version of the firmware.

22. A system comprising:

one or more servers that provide a cloud-based firmware distribution service by receiving a request for firmware and providing information to enable retrieval of a particular version of firmware for at least multiple types of network; and a first network device communicatively coupled to the one or more servers and operating as a virtual control device for a second network device, the first network device comprises a processor, a memory, and a communication interface that collectively operate to (i) send information regarding a first version of firmware installed on the first network device to the one or more servers, (ii) receive information to download firmware including one or more uniform resource locators (URLs) providing access to a second version of the firmware, and (iii) responsive to receiving the information, (a) downloading the second version of the firmware that is different from the first version of the firmware installed on the first network device, (b) providing the downloaded second version of the firmware to the second network device when the second network device is a same device type as the first network device, and (c) providing the information to at least the second network device when the second network device is a different device type than the first network device, the information enabling the second network device to access a second version of the firmware for the different device type directly from the one or more servers.

23. The system of claim 22, wherein the one or more URLs providing access to one or more firmware images, each URL corresponds to a firmware image associated with at least a different type of network device.

24. The system of claim 22, wherein the one or more URLs associated with the information to download firmware are received by the first network device and comprise information to identify one or more storage locations for accessing a firmware image of the second version of the firmware.

* * * * *